(12) United States Patent
Yu

(10) Patent No.: US 11,909,284 B2
(45) Date of Patent: Feb. 20, 2024

(54) FLAT-TYPE STATOR WITH MULTILAYER COILS FOR DISC-TYPE MOTOR

(71) Applicant: Renwei Yu, Wuhan (CN)

(72) Inventor: Renwei Yu, Wuhan (CN)

( * ) Notice: Subject to any disclaimer, the term of this patent is extended or adjusted under 35 U.S.C. 154(b) by 452 days.

(21) Appl. No.: 17/383,542

(22) Filed: Jul. 23, 2021

(65) Prior Publication Data

US 2021/0351652 A1  Nov. 11, 2021

Related U.S. Application Data

(63) Continuation of application No. PCT/CN2019/094798, filed on Jul. 5, 2019.

(51) Int. Cl.
| | | |
|---|---|---|
| H02K 3/28 | (2006.01) |
| H02K 3/26 | (2006.01) |
| H02K 21/24 | (2006.01) |
| H02K 23/54 | (2006.01) |
| H02K 3/04 | (2006.01) |

(52) U.S. Cl.
CPC ................ *H02K 3/04* (2013.01); *H02K 3/28* (2013.01)

(58) Field of Classification Search
CPC .. H02K 3/04; H02K 3/28; H02K 3/22; H02K 3/26; H02K 21/24; H02K 21/12; H02K 23/54
See application file for complete search history.

(56) References Cited

U.S. PATENT DOCUMENTS

| | | | | |
|---|---|---|---|---|
| 4,363,988 A | | 12/1982 | Kliman | |
| 4,658,162 A | * | 4/1987 | Koyama | ................. H02K 29/08 318/135 |
| 4,804,574 A | * | 2/1989 | Osawa | ................... H02K 5/225 428/209 |
| 5,945,766 A | * | 8/1999 | Kim | ....................... H02K 11/33 310/43 |
| 5,955,813 A | * | 9/1999 | Bolte | ....................... H02K 3/00 310/67 R |
| 7,190,101 B2 | * | 3/2007 | Hirzel | ..................... H02K 21/24 310/180 |

(Continued)

FOREIGN PATENT DOCUMENTS

| | | |
|---|---|---|
| CN | 105375655 A | 3/2016 |
| CN | 206402000 A | 8/2017 |

(Continued)

OTHER PUBLICATIONS

Internation Search Report of PCT/CN2019/094798, dated Mar. 27, 2020.

*Primary Examiner* — Edgardo San Martin

(57) ABSTRACT

A flat-type stator with multilayer coils for a disc-type motor is provided with a stator coil and a flat stator base, wherein a coil assembly is arranged in the stator coil, and a plurality of coil assemblies are arranged in a ring or in a straight line on the stator base; the coil assembly is formed by stacking even-numbered layers of single coils overlapped with the stator base in a vertical direction, each single coil is composed of even-numbered layers of single-layer coils wound by a single wire, and the single-layer coil is provided with a single axial wire; metal wires are sequentially connected in series among the plurality of coil assemblies to form a coil unit, the single coils in the coil unit have a same structure and a same shape and are not overlapped axially.

8 Claims, 2 Drawing Sheets

(56) References Cited

U.S. PATENT DOCUMENTS

| | | | |
|---|---|---|---|
| 7,772,733 B2 * | 8/2010 | Chen | H02K 21/24 |
| | | | 310/239 |
| 9,887,597 B2 * | 2/2018 | Horng | H02K 11/33 |
| 10,389,218 B2 * | 8/2019 | Yu | H02K 15/04 |
| 11,677,303 B2 * | 6/2023 | Tsai | H02K 3/47 |
| | | | 310/268 |
| 2002/0153792 A1 | 10/2002 | Isozaki et al. | |
| 2003/0052553 A1 | 3/2003 | Isozaki et al. | |
| 2012/0133231 A1 * | 5/2012 | Hayakawa | H02K 21/24 |
| | | | 310/156.37 |
| 2018/0212489 A1 * | 7/2018 | Schuler | H02K 1/2798 |

FOREIGN PATENT DOCUMENTS

| | | | | |
|---|---|---|---|---|
| CN | 108092435 A | | 5/2018 | |
| CN | 109245369 A * | | 1/2019 | |
| CN | 114765388 A * | | 7/2022 | |
| JP | H09168270 A * | | 6/1997 | H02K 3/04 |
| WO | WO-8603351 A1 * | | 6/1986 | H02K 3/26 |
| WO | WO-2004047252 A1 * | | 6/2004 | H02K 3/26 |
| WO | WO-2021003589 A1 * | | 1/2021 | |

\* cited by examiner

FLAT-TYPE STATOR WITH MULTILAYER COILS FOR DISC-TYPE MOTOR

CROSS-REFERENCE TO RELATED APPLICATIONS

This application is a continuation of International Patent Application No. PCT/CN2019/094798 with a filing date of Jul. 5, 2019, designating the United States. The content of the aforementioned applications, including any intervening amendments thereto, are incorporated herein by reference.

TECHNICAL FIELD

The present invention relates to a disc-type motor, and more particularly, to a flat-type stator with multilayer coils for a disc-type motor.

BACKGROUND

A traditional disc-type motor has a low power density. The inventor discovered a technical solution of a disc-type motor capable of breaking through the bottleneck of the traditional disc-type motor through experiments. When the disc-type motor is applied to a disc-type generator, aiming at a stator for the disc-type generator, the stator for the disc-type generator in the prior art is provided with an iron core, and is large in volume and weight, so that a power density and an output efficiency are very low and the volume is relatively large. Therefore, a low efficiency of the disc-type motor has become a recognized bottleneck for a long time, which makes the disc-type motor difficult to be widely used beyond some special fields.

SUMMARY

The technical problem to be solved by the present invention is to provide a flat-type stator with multilayer coils for a disc-type motor, which makes full use of a magnetic field provided by permanent magnets on a rotor, and greatly improves an output efficiency and a power density of a low-power motor.

The flat-type stator with multilayer coils for the disc-type motor is provided with a stator coil and a flat stator base made of an insulating non-magnetic conductive material, wherein a plurality of hollow coil assemblies are arranged on two side surfaces perpendicular to a direction of the stator base in an overlapped shape in the stator coil, and the plurality of radially adjacent coil assemblies are arranged in a ring or a strip on the stator base;

the coil assembly is formed by stacking even-numbered layers of single coils overlapped with the stator base in a vertical direction, each single coil is composed of even-numbered layers of single-layer coils wound by a single wire, the single-layer coil is provided with a single axial wire, and an axial dimension of the single-layer coil is a width of a coil wire; metal wires are sequentially connected in series among a circle of horizontally adjacent coil assemblies to form a coil unit, the single coils in the coil unit have a same structure and a same shape and are not overlapped axially, numbers of layers of the coil assemblies are the same, winding directions of the single-layer coils in the same single coil are the same, and a winding-in end and a winding-out end of the single coils are both located on an outer ring of the coil and are tangentially led out without radially crossing the metal wires.

Preferably, a cross section of the coil wire is flat.

Preferably, a ratio of an outer circumference diameter of the stator coil arranged in a ring to a thickness of the stator coil is 6 to 60.

Preferably, a ratio of a width of the stator coil arranged in a straight line to a thickness of the stator coil is 1.2 to 50.

Preferably, multiple sets of independent coil units connected by the single-end coil wire are provided, and the single coils of each set of coil unit have only one layer or a same number of layers.

An embodiment of an arrangement mode is that the single coils in each set of coil unit of the same stator base are arranged and connected through a same plane parallel to the stator base.

An embodiment of another arrangement mode is that the single coils in each set of coil unit of the same stator base are staggered and connected in different planes.

Preferably, when a total number of layers of the single-layer coil is greater than two, a number of turns of the single coil located in an inner layer is greater than that of the single coil located in an outer layer.

Starting from improving a magnetic flux utilization rate, the present invention is applied to a low-power motor less than 30 KW without an iron core, which abandons a traditional mode of arranging an iron core coil, and uses a limited magnetic field space to cut magnetic lines of force for as many copper wires as possible, but after omitting the iron core, a volume and a weight of the motor are greatly reduced under a same output power.

Through reasonable arrangement of the coil, the motor stator of the present invention improves a utilization rate of the magnetic field space as much as possible, increases a proportion of copper and reduces a copper loss, reduces a magnetic field asymmetry, implements an equipotential output, reduces an internal resistance loss, improves a power density, and improves an output efficiency, and the efficiency is proved to be improved obviously through experiments. When a rotating speed of a corresponding rotor is less than 2000 rpm, an output power density is greater than 0.86 KW/kg, and when the rotating speed of the corresponding rotor is less than 4000 rpm, a maximum output power density can reach 1.72 KW/kg. A proportion of stator copper can reach over 50%, which is 5 times or above that of a traditional motor. A disc-type motor with an iron core has a small inductive load and a weak overload capacity, while the disc-type motor without an iron chip of the present invention has a strong overload capacity, which is over 50% of that of the motor with the iron core. According to actual measurement, for example, when the weight of the motor is 4.2 kg, the output efficiency reaches 90% in a range of 2.5 KW to 6 KW.

Figure 1:
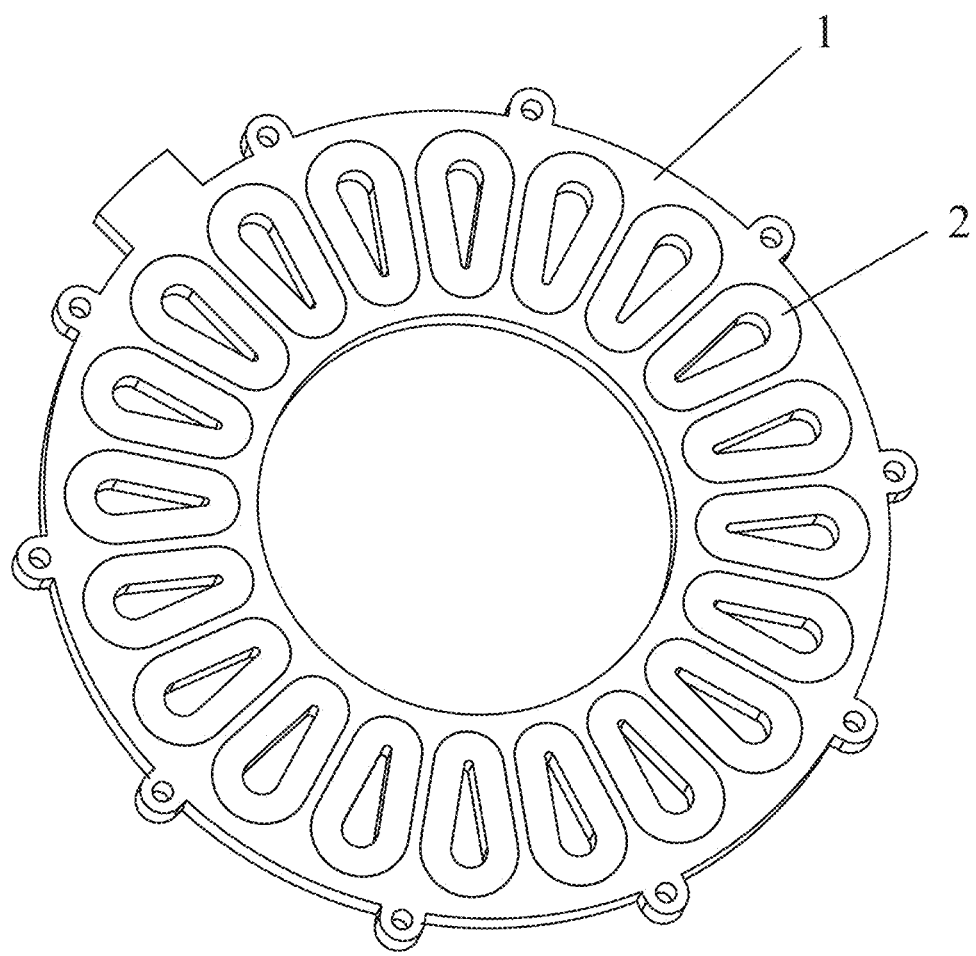
FIG. 1 is a schematic diagram of a stereoscopic structure of the present invention.

In the drawings, 1 refers to stator base, 2 refers to coil assembly, 3 refers to coil unit, 4 refers to single coil, 5 refers to single-layer coil, 6 refers to coil wire, and 7 refers to winding-in end.

DETAILED DESCRIPTION

The present invention is further described with reference to the accompanying drawings and the embodiments: as shown in FIG. 1, a flat-type stator with multilayer coils for a disc-type motor is provided with a stator coil and a flat stator base 1 made of an insulating non-magnetic conductive material, and the stator coils are fixedly mounted on two side surfaces of the flat stator base 1. Generally, the stator coils are symmetrically mounted on two side surfaces of the stator base 1.

Figure 2:
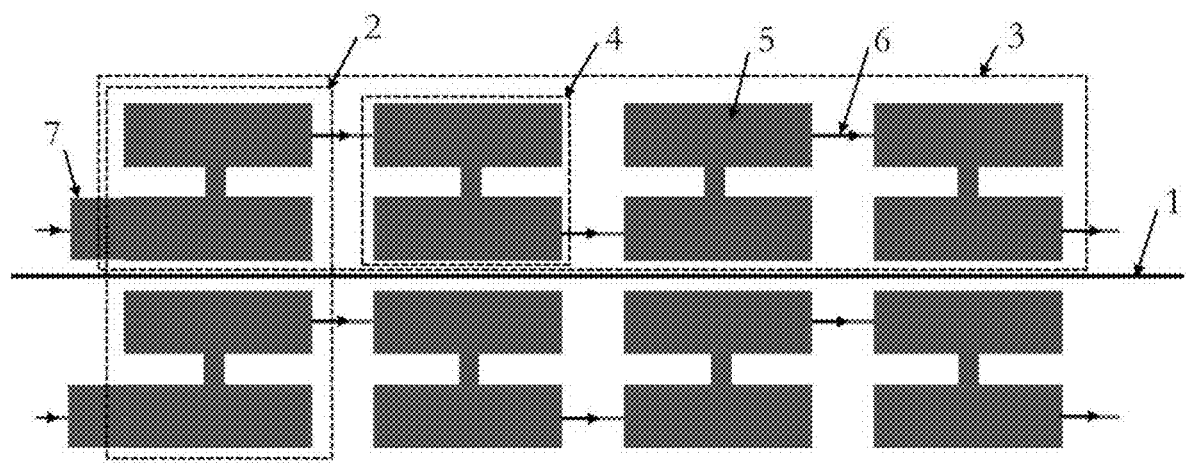
FIG. 2 is a coil arrangement structure of single coils in a same plane.
Figure 3:
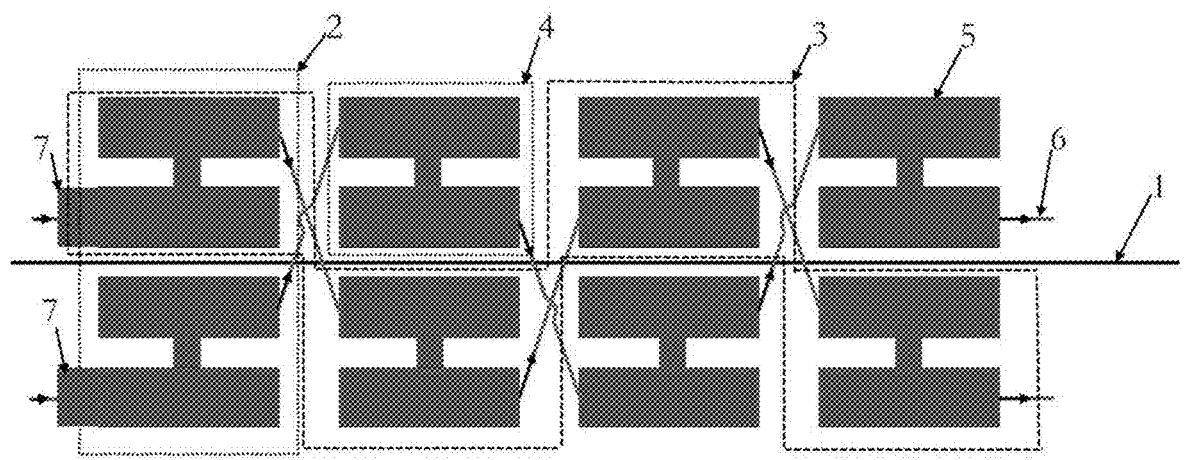
FIG. 3 is a coil arrangement structure of single coils in different planes.

As shown in FIG. 2 and FIG. 3, a plurality of hollow coil assemblies 2 are arranged on two side surfaces perpendicular to a direction of the stator base in an overlapped shape in the stator coil, the coil assembly 2 refers to a stack of coils which are single but overlapped with each other when viewed perpendicular to the stator base, and the plurality of coil assemblies 2 are arranged in a ring or a straight line on the stator base 1. When the stator base 1 is of a disc shape, the motor is an ordinary disc-type motor, and the coil assemblies 2 are evenly arranged in a ring. When the stator base 1 is of a strip shape, the motor is a linear motor, and the coil assemblies 2 are evenly arranged in a straight line.

The coil assembly 2 is formed by stacking even-numbered layers of single coils 4 overlapped with the stator base in a vertical direction, each single coil 4 is composed of even-numbered layers of single-layer coils 5 wound by a single wire, the single-layer coil 5 is provided with a single axial wire, and an axial dimension of the single-layer coil 5 is a width of a coil wire 6. As shown in FIG. 2 and FIG. 3, the coil assemblies 2 are symmetrically arranged on two sides of the stator base 1, and each side is respectively provided with the single coil 4, so that there must be an even number of single coils 4 in the same coil assembly 2. In FIG. 2 and FIG. 3, each single coil 4 is composed of two layers of single-layer coils 5, the two layers of single-layer coils 5 are wound by a same coil wire 6, and each layer of single-layer coil 5 has only one coil wire 6 in a direction perpendicular to the stator base.

A cross section of the coil wire 6 is flat. An ideal shape of the cross section is rectangular, which may make full use of a magnetic field space. A proportion of copper is increased, and a current generated by cutting magnetic lines of force by the stator is outputted with a small internal resistance and a power as large as possible.

In order to increase a number of turns of the single-layer coil 5 on a diameter of the same coil assembly, the flat single-layer coil 5 in an axial direction is in a width direction of the coil wire 6 and the flat single-layer coil in a radial direction is in the width direction of the coil wire 6.

In FIG. 2 and FIG. 3, two layers of single-layer coils 5 of the same single coil 4 are wound by the same coil wire 6 in a same rotating direction.

The plurality of coil assemblies 2 are sequentially connected in series by the metal wires to form the coil unit 3. On the disc-shaped stator base 1, one coil unit 3 is wound in a circle on the stator base. The single coils 4 have a same structure and a same shape and are not overlapped axially. There may be a plurality of coil units. The coil assemblies 2 have a same number of layers, the single-layer coils 5 in the same single coil 4 have a same winding direction, and output electromotive forces of the coil units 3 on the same stator base 1 are basically the same, so as to be convenient for doubling the input ends and paralleling the output ends to increase an output power.

The winding-in end 7 and winding-out end of the single coils 4 are both located on an outer ring of the coil and are tangentially led out without radially crossing the metal wires. Even-numbered single-layer coils 5 are suitable for winding the coil wire into a center of one layer of single-layer coil from an outer circumference of one layer of single-layer coil step by step, and winding the coil wire out of an outer circumference of another layer of single-layer coil from a center of another layer of single-layer coil, thus being connected from one single coil to another single coil. Multi-layer and multi-turn winding can increase a proportion of copper and reduces a copper loss, reduces a magnetic field asymmetry, implements an equipotential output, reduces an internal resistance loss, improves a power density, and improves an output efficiency.

In order to meet a requirement of a high power density, a ratio of an outer circumference diameter of the stator coil arranged in a ring to a thickness of the stator coil is 6 to 60. A ratio of a width of the stator coil arranged in a straight line to a thickness of the stator coil is 1.2 to 50. Then, a distance between the permanent magnets on the rotors on two sides of the coil stator is close enough to ensure that the coil works within enough magnetic field strength, and then the advantages of the disc-type motor without the iron core are shown.

In an embodiment, multiple sets of independent coil units 3 connected by the single-end coil wire 6 are provided, and the single coils 4 of each set of coil unit 3 have a same number of layers. In the embodiments in FIG. 2 and FIG. 3, two sets of coil units are provided. Each single-layer coil is unidirectionally wound by a single coil wire, which may generate multiple independent outputs. In this way, the magnetic field space may be fully utilized on the premise of meeting an output current, and the proportion of copper is increased.

As shown in FIG. 2, the single coils 4 in each set of coil unit 3 of the same stator base 1 are arranged and connected through a same plane parallel to the stator base 1, which can reduce a magnetic field asymmetry and an internal resistance loss.

As shown in FIG. 3, the single coils 4 in each set of coil unit 3 of the same stator base 1 are staggered and connected in different planes. Due to different magnetic field intensities at different positions in an axial direction, the arrangement can reduce a magnetic field asymmetry, and implements an equipotential output of each set of coil unit 3, so as to be convenient for doubling output of different coil units.

When there are more than four layers of single-layer coils 5, due to a large distance between a pair of rotors, a magnetic field strength at a central position is low, resulting in a difference in output potential. A number of turns of the single coil 4 located in an inner layer is greater than that of the single coil 4 located in an outer layer to balance the potential difference.

Different layers of single coils are respectively manufactured in advance as semi-finished products during manufacturing, the single coils are fixed at corresponding positions on the stator base, and then lead-out wires of the single coils are connected as required.

Two sides of the stator of the present invention are matched with a pair of rotors with a circle of alternating magnetic field to be used as a power generation device. Due to no-phase difference output of a plurality of independent coil units, an output continuity can be implemented only when an output frequency is above 300 Hz, and a better power supply can be provided for a frequency conversion module.

What is claimed is:

1. A flat-type stator with multilayer coils for a disc-type motor provided with a stator coil and a flat stator base (1) made of an insulating non-magnetic conductive material, wherein a plurality of hollow coil assemblies (2) are arranged on two side surfaces perpendicular to a direction of the stator base in an overlapped shape in the stator coil, and the plurality of radially adjacent coil assemblies (2) are arranged in a ring or a strip on the stator base (1);

the coil assembly (2) is formed by stacking even-numbered layers of single coils (4) overlapped with the stator base in a vertical direction, each single coil (4) is composed of even-numbered layers of single-layer coils (5) wound by a single wire, the single-layer coil (5) is provided with a single axial wire, and an axial dimension of the single-layer coil (5) is a width of a coil wire (6); metal wires are sequentially connected in series among a circle of horizontally adjacent coil assemblies to form a coil unit (3), the single coils (4) in the coil unit (3) have a same structure and a same shape and are not overlapped axially, numbers of layers of the coil assemblies (2) are the same, winding directions of the single-layer coils (5) in the same single coil (4) are the same, and a winding-in end (7) and a winding-out end of the single coils (4) are both located on an outer ring of the coil and are tangentially led out without radially crossing the metal wires.

2. The flat-type stator with the multilayer coils for the disc-type motor according to claim 1, wherein a cross section of the coil wire (6) is flat.

3. The flat-type stator with the multilayer coils for the disc-type motor according to claim 1, wherein a ratio of an outer circumference diameter of the stator coil arranged in a ring to a thickness of the stator coil is 6 to 60.

4. The flat-type stator with the multilayer coils for the disc-type motor according to claim 1, wherein a ratio of a width of the stator coil arranged in a straight line to a thickness of the stator coil is 1.2 to 50.

5. The flat-type stator with the multilayer coils for the disc-type motor according to claim 1, wherein multiple sets of independent coil units (3) connected by the single-end coil wire (6) are provided, and the single coils (4) of each set of coil unit (3) have only one layer or a same number of layers.

6. The flat-type stator with the multilayer coils for the disc-type motor according to claim 1, wherein the single coils (4) in each set of coil unit (3) of the same stator base (1) are arranged and connected through a same plane parallel to the stator base (1).

7. The flat-type stator with the multilayer coils for the disc-type motor according to claim 6, wherein the single coils (4) in each set of coil unit (3) of the same stator base (1) are staggered and connected in different planes.

8. The flat-type stator with the multilayer coils for the disc-type motor according to claim 1, wherein when a total number of layers of the single-layer coil (5) is greater than two, a number of turns of the single coil (4) located in an inner layer is greater than that of the single coil (4) located in an outer layer.

* * * * *